United States Patent
Hsu (10) Patent No.: US 8,200,721 B2
(45) Date of Patent: *Jun. 12, 2012

(54) SYSTEM AND METHOD FOR PROVIDING WRITE-ONCE-READ-MANY (WORM) STORAGE

(75) Inventor: Windsor W. Hsu, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,273

(22) Filed: Jun. 7, 2011

(65) Prior Publication Data

US 2011/0238714 A1 Sep. 29, 2011

Related U.S. Application Data

(63) Continuation of application No. 11/839,453, filed on Aug. 15, 2007, now Pat. No. 7,958,166.

(51) Int. Cl.
*G06F 12/00* (2006.01)
(52) U.S. Cl. ........................................................ 707/821
(58) Field of Classification Search .................. 707/821, 707/999.002
See application file for complete search history.

(56) References Cited

U.S. PATENT DOCUMENTS

| | | | |
|---|---|---|---|
| 5,444,728 A | 8/1995 | Thompson | |
| 5,535,188 A | 7/1996 | Dang et al. | |
| 6,804,687 B2 | 10/2004 | Sampson | |
| 6,879,454 B2 | 4/2005 | Winarski et al. | |
| 6,933,032 B2 | 8/2005 | Sasa et al. | |
| 7,155,460 B2 | 12/2006 | McGovern et al. | |
| 7,284,204 B2 | 10/2007 | Lee | |
| 7,467,273 B2* | 12/2008 | Ishida et al. | 711/163 |
| 7,752,401 B2* | 7/2010 | Merrick et al. | 711/161 |
| 2005/0007685 A1 | 1/2005 | Winarski et al. | |
| 2005/0097260 A1* | 5/2005 | McGovern et al. | 711/100 |
| 2005/0231846 A1 | 10/2005 | Winarski et al. | |
| 2005/0235095 A1 | 10/2005 | Winarski et al. | |
| 2005/0240636 A1* | 10/2005 | Shitomi et al. | 707/204 |
| 2006/0085487 A1* | 4/2006 | Hara et al. | 707/200 |
| 2006/0123232 A1* | 6/2006 | Cannon et al. | 713/165 |
| 2006/0126468 A1 | 6/2006 | McGovern et al. | |
| 2006/0129588 A1* | 6/2006 | Hsu et al. | 707/102 |
| 2006/0168415 A1 | 7/2006 | Ishii et al. | |

(Continued)

OTHER PUBLICATIONS

*Supplementary Partial European Search Report*, Application No. EP08827264, dated May 11, 2011, 6 pages.

(Continued)

*Primary Examiner* — John Cottingham
*Assistant Examiner* — Mohammed R Uddin
(74) *Attorney, Agent, or Firm* — Blakely Sokoloff Taylor & Zafman LLP (57) ABSTRACT

Techniques for providing write-once-read-many (WORM) storage are described herein. According to one embodiment, in response to a command to set a time attribute of a file to a first predetermined value, it is determined whether the first predetermined value is outside of an ordinary range of values associated with the time attribute in accordance with a file system associated with the file. The file is designated as a WORM file and a WORM retention period is set for the file based on the first predetermined value, if the first predetermined value is outside of an ordinary range of values associated with the time attribute. The designation of the file as a WORM file and setting the WORM retention period are performed in response to the command.

21 Claims, 6 Drawing Sheets

U.S. PATENT DOCUMENTS

| | | |
|---|---|---|
| 2006/0221713 A1 | 10/2006 | VanBuskirk et al. |
| 2006/0239161 A1 | 10/2006 | Takahashi et al. |
| 2007/0043773 A1 | 2/2007 | Tsuji |
| 2007/0118687 A1* | 5/2007 | McGovern et al. ........... 711/112 |
| 2007/0179990 A1* | 8/2007 | Zimran et al. ................ 707/201 |
| 2008/0172563 A1* | 7/2008 | Stokes .......................... 713/193 |
| 2011/0191306 A1* | 8/2011 | Akagawa et al. ............. 707/692 |

OTHER PUBLICATIONS

*International Search Report,* Application No. PCT/US2008/070097, dated Oct. 9, 2008, 1 page.

* cited by examiner

```
struct stat {
    dev_t      st_dev;       /*device*/
    ino_t      st_ino;       /*inode*/
    mode_t     st_mode;      /*protection*/
    nlink_t    st_nlink;     /*number of hard links*/
    uid_t      st_uid;       /*user ID of owner*/
    gid_t      st_gid;       /*group ID of owner*/
    dev_t      st_rdev;      /*device type (if inode device)*/
    off_t      st_size;      /*total size, in bytes*/
    blksize_t  st_blksize;   /*blocksize for filesystem I/O*/
    blkcnt_t   st_blocks;    /* number of blocks allocated*/
    time_t     st_atime;     /*time of last access*/
    time_t     st_mtime;     /*time of last modification*/
    time_t     st_ctime;     /*time of last status change*/
};
```

FIG. 3A

| File ID | WORM Attributes |
|---------|-----------------|
| File 1  | 072510          |
| File 2  | ...             |
| ...     | ...             |

SYSTEM AND METHOD FOR PROVIDING WRITE-ONCE-READ-MANY (WORM) STORAGE

RELATED APPLICATIONS

This application is a continuation of U.S. patent application Ser. No. 11/839,453, filed Aug. 15, 2007, now U.S. Pat. No. 7,958,166, which is incorporated by reference in its entirety.

FIELD OF THE INVENTION

The present invention relates generally to data storage. More particularly, this invention relates to write-once-read-many storage.

BACKGROUND

Electronic data can be modified relatively easily and without leaving much of a trace. As organizations increasingly rely on electronic data, it is important to protect these data from improper modification. One way of protecting the data from modification is to store the data in Write-Once-Read-Many (WORM) storage.

Many business entities rely on some form of WORM storage to store critical data. In many industries, such as the financial services and healthcare industries, businesses are required by strict records-retention regulations to archive important data, such as emails, transaction information, patient records, audit information, as well as other types of documents and data. In addition, many business entities place a premium on protecting certain business records or critical data files from accidental or intentional alteration or deletion. WORM functionality such as non-erasable and non-rewritable data storage can ensure long-term data permanence, even where regulatory compliance does not require the use of WORM storage.

Traditionally, WORM storage is implemented using optical storage where the storage media is inherently write-once. However, optical recording has not been improving at the rate of magnetic recording so that it has become relatively expensive to store data in optical storage. Moreover, what is increasingly required in practice is to protect individual pieces of data (records, files, emails, data objects, etc) from modification for some specified retention period.

Several systems that protect individual pieces of data from modification for some specified retention period have been introduced recently, such as, for example, the Centera from EMC, the Data Retention 550 from IBM and the SnapLock from Network Appliance. The EMC Centera and IBM Data Retention 550 use their own non-standard interfaces to allow a user or application to specify that a data object should be protected from change for some duration. They require applications to be written specifically to their own interfaces. The Network Appliance SnapLock overloads selected attributes in standard file system interfaces to flag a file as WORM and to associate a retention period with the file. It, however, uses multiple attributes and requires multiple operations so the act of setting the retention period and committing a file to be WORM may not be atomic and is unnecessarily complex and costly.

SUMMARY OF THE DESCRIPTION

Techniques for providing write-once-read-many (WORM) storage are described herein. According to another aspect of the invention, in response to a command to set a time attribute of a file to a first predetermined value, it is determined whether the first predetermined value is outside of an ordinary range of values associated with the time attribute in accordance with a file system associated with the file. If so, the file is designated as a WORM file and a WORM retention period is configured for the file based on the first predetermined value.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for providing write-once-read-many (WORM) storage are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, an existing attribute associated with a file (or record, or data object, etc) (e.g., a standard file attribute associated with a file system) can be configured to a value outside its typical range to signal that a management action should be performed on the file, where the management action is unrelated to the normal operations associated with the attribute. To reduce false signals, according to one embodiment, an acceptable range of values for the signal can be specified, where the acceptable range of values is outside of the typical range of values of the attribute. In one embodiment, multiple signals, each with an acceptable range of values outside the typical range of values of the attribute, can be specified for an attribute. In one embodiment, the system uses one of the time attributes typically associated with a file to indicate that a file should be WORM (protected from modification including delete) for a period of time, where the period of time is specified via the value of the time attribute via a file system call and/or an operating system call.

Figure 3A:
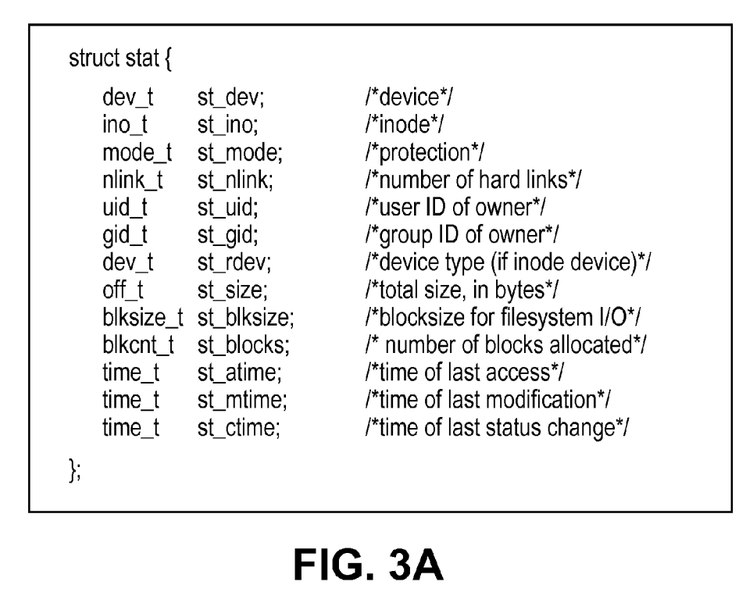
FIG. 3A is a data structure for storing file information according to a UNIX compatible file system.

Examples of time attributes typically associated with a file may be a modification time (mtime), a status change time (ctime), and/or an access time (atime) in a typical operating system such as UNIX operating system, as shown in FIG. 3A. Other systems may include other times such as a creation time. For purposes of illustration, a term of "stime" (some time) is used to refer to any one of these time attributes.

Figure 1:
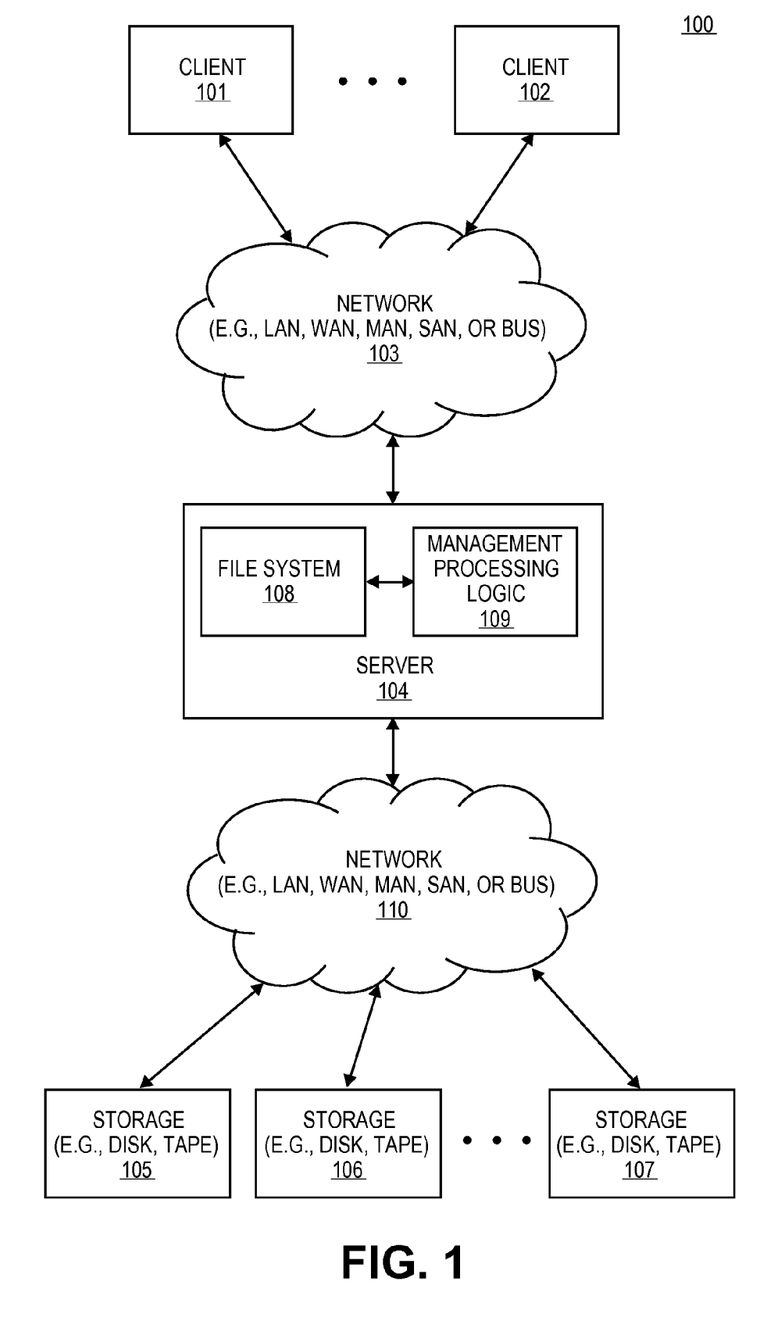
FIG. 1 is a block diagram illustrating a system configuration according to one embodiment of the invention.

FIG. 1 is a block diagram illustrating a system configuration according to one embodiment of the invention. Referring to FIG. 1, system configuration 100 includes, but is not limited to, one or more clients 101-102 communicatively coupled to a server 104 over a network 103 to access data stored in any of storage 105-107 over a network 110. Clients 101-102 may be any type of clients such as a server, a personal computer, a "thin" client, a personal digital assistant (PDA), a Web enabled appliance, or a Web enabled cellular phone, etc. Server 104 may include any type of server or cluster of servers. For example, server 104 may be a storage server used for any of various different purposes, such as to provide multiple users with access to shared data and/or to back up mission critical data. Server 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Server 104 may have a distributed architecture, or all of its components may be integrated into a single unit.

Network 103 may be any type of network such as a local area network (LAN), a wide area network (WAN) such as Internet, a corporate intranet, a metropolitan area network (MAN), a storage area network (SAN), a bus, or a combination thereof Likewise, network 110. Storage 105-107 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage 105-107 may also be combinations of such devices. In the case of disk storage media, the storage devices 105-107 may be organized into one or more volumes of Redundant Array of Inexpensive Disks (RAID). Server 104 and/or storage 105-107 may be implemented as part of an archive and/or backup systems such as the deduplication systems available from Data Domain, Inc. of Santa Clara, Calif.

According to one embodiment, server 104 includes a file system 108 and management processing logic 109 such as WORM processing logic. File system 108 may be any kind of file systems. A file system generally refers to a structuring of data and metadata on a storage device, such as disks, which permits reading/writing of data on those disks and/or the processing logic to enable such structuring. The metadata is organized in data structures such as inodes that are used to store information about a file, where the data blocks are structures used to store the actual data for the file. The information contained in an inode, as shown in FIG. 3A, may include, for example, ownership of the file, access permission for the file, size of the file, file type and references to locations on disk of the data blocks for the file. The references to the locations of the file data are provided by pointers in the inode, which may further reference indirect blocks that, in turn, reference the data blocks, depending upon the quantity of data in the file.

Management processing logic 109 may be implemented as part of file system 108 or a separate module communicatively coupled to the file system 108. As described above, an existing attribute associated with a file (e.g., a standard file attribute associated with a file system) can be configured to a value outside its typical range to signal that a management action should be performed on the file. The management action may be unrelated to the normal operations associated with the attribute. In one embodiment, in response to a request to set an attribute of a file to a particular value, where the attribute is a standard file attribute of a typical file system, management processing logic 109 determines whether the particular value is outside of a typical range of values associated with the attribute being set in view of an ordinary usage of the attribute. If the particular value is outside of the ordinary range of values of the attribute, the management processing logic 109 may perform certain management action or actions that have been previously assigned to the attribute and that may be unrelated to an ordinary action associated with the attribute in view of the file system. Otherwise, if the particular value is within an ordinary range of values associated with the attribute, the file system 108 will perform ordinary action or actions associated with the attribute.

For example, according to one embodiment, a time attribute (e.g., atime, ctime, or mtime) typically associated with a file is used to indicate that a file should be WORM for a period of time, where the period of time is specified via the value of the time attribute. Note that throughout this application, WORM related actions are used as examples of management actions for the purpose of illustration only. It will be appreciated that other types of management actions or functions may also be applied.

In this example, the indication of whether a file is designated as a WORM file is unrelated to the time attribute associated with the file. When a request for setting a time attribute of a file is received, the management processing logic 109 determines whether the value the time attribute is to be set to is outside of an ordinary range of the time attribute associated with the file. If so, the management processing logic 109 interprets this request as a request to configure the file as a WORM file and the time value to be set is related to a WORM retention date associated with the file being configured as a WORM file. The WORM retention date is used to determine a WORM retention period during which the WORM file cannot be modified or deleted. However, once the WORM retention period expires, the file can be deleted. In one embodiment, after the WORM retention period expires, the file is treated as an ordinary file that can be modified or deleted. Thus, unlike a conventional method, which requires multiple operations in order to accomplish the above purposes, a single command can be used to commit a file to be a WORM file and to configure a WORM retention period for the WORM file being committed. Other configurations may also exist.

Figure 2:
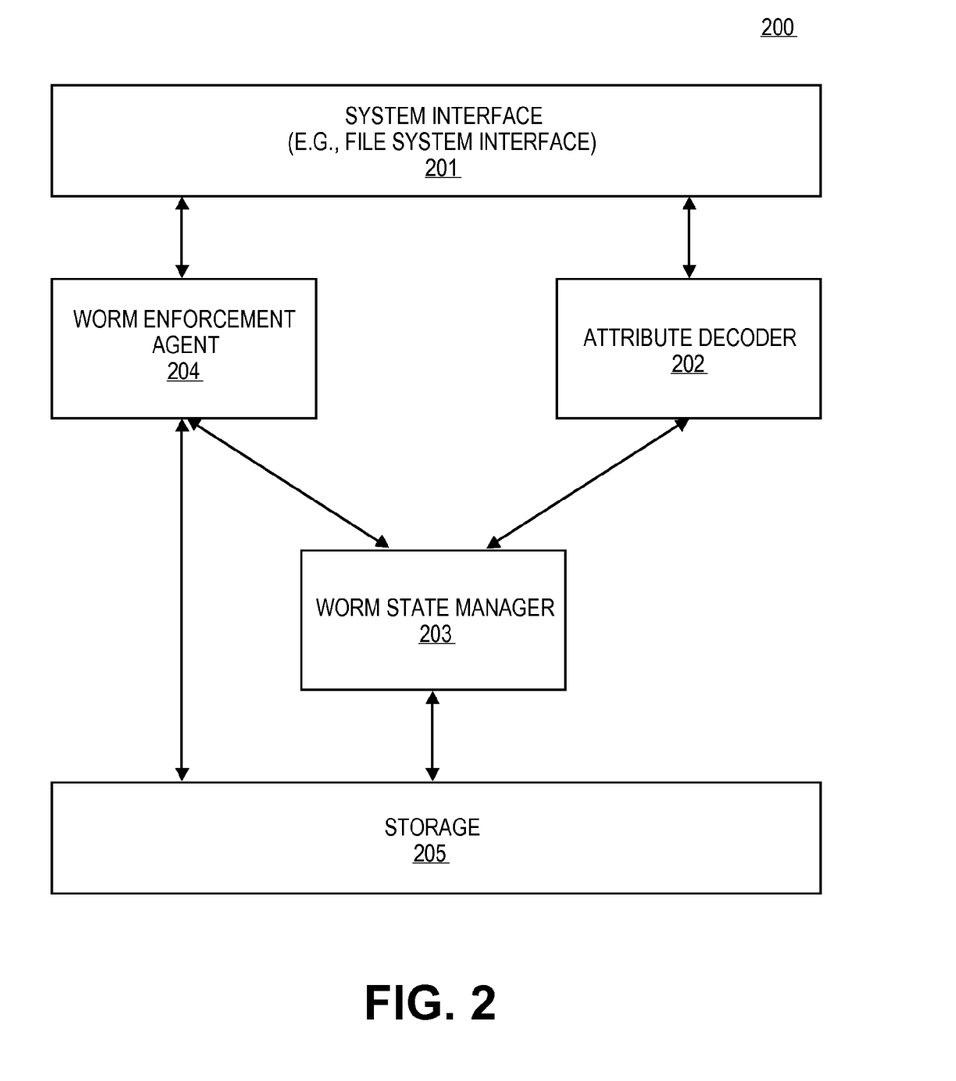
FIG. 2 is a block diagram illustrating a system for handling WORM files according to one embodiment of the invention.

FIG. 2 is a block diagram illustrating a system for handling WORM files according to one embodiment of the invention. For example, system 200 may be implemented as part of management processing logic 109 and/or file system 108 of server 104 in FIG. 1. In this example, the management actions are WORM related actions. Referring to FIG. 2, system 200 includes, but is not limited to, an attribute decoder 202, a WORM state manager 203, and a WORM enforcement agent 204 coupled to a system interface 201 and storage 205. System interface 201 may be a part of file system interface that communicates with an application via various file system calls dependent upon an operating system associated with the file system. Storage 205 may be any kind of storage devices such as storage 105-107 of FIG. 1.

According to one embodiment, a time attribute (e.g., ctime, mtime, atime) associated with a file is used to specify whether a file should be committed as a WORM file and a WORM retention period for the WORM file. In one embodiment, prior to setting a time attribute of a file to designate the file as a WORM file, a range of values is provided to system 200, where the range of values is outside an ordinary range of a typical time attribute of a file in an ordinary file system. For example, an ordinary range of values for a time attribute such as ctime, mtime, atime is a time in the past so any future time is outside the ordinary range of values for such attributes. In response, WORM related actions are associated with the received range of values. In this example, the WORM related actions are unrelated to ordinary time related actions.

Subsequently, when a request for setting a time attribute of a file to a specific value is received at system interface 201 (e.g., via a file system call), attribute decoder 202 examines the request in view of the specific value to determine whether the specific value is within the range of values that has been associated with WORM related actions and outside of an ordinary range of time related values. If so, the WORM state manager 203 is invoked to commit the file as a WORM file. In one embodiment, the WORM state manager 203 sets a separate attribute of the file for indicating that the file is a WORM file. In one embodiment, the ordinary time attribute of the file is not modified. That is, a value to be set to the time attribute that is outside of an ordinary range of the time attribute is merely used to indicate that the associated file is to be designated as a WORM file. Alternatively, the time attribute may be set to the specific value and an application can subsequently retrieve the value by pulling the file information (e.g., stat structure under UNIX operating system) via a file system call.

Figure 3B:
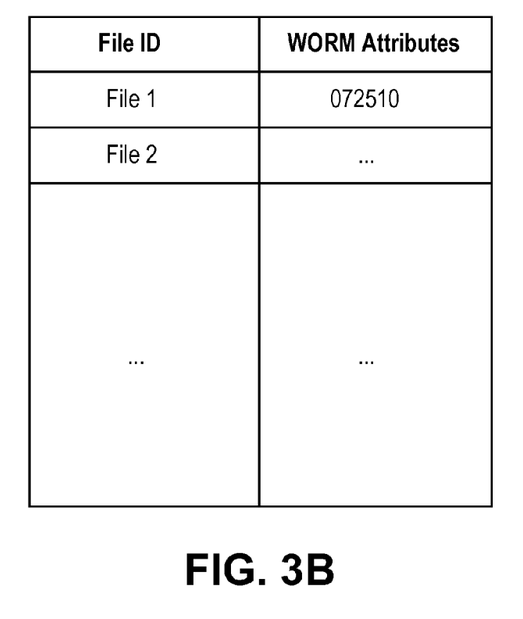
FIG. 3B is a block diagram illustrating a data structure for storing WORM related attributes according to one embodiment.

In addition, according to one embodiment, the value to be set is used to determine a WORM retention period for the WORM file. The value may be stored in the system as a WORM retention date as shown in FIG. 3B, where the WORM retention date is used to calculate a WORM retention period for the associated file. A WORM retention period is referred to as a time period during which the associated file is designated as a WORM file. Thus, within the WORM retention period, if an application or a user attempts to modify or delete the WORM file, such an attempt will be rejected by the WORM enforcement agent 204 and/or an error message (e.g., a permission denied error) may be presented to the application or user, indicating that the file is a WORM file and cannot be modified or deleted. However, when the WORM retention period of the file expires, the file may be deleted. In one embodiment, after the WORM retention period expires, the file is treated as an ordinary file that can be modified or deleted.

Therefore, a single command may be used to commit a file as a WORM file and configure the WORM retention period for the WORM file. For example, according to one embodiment, a single command may be implemented as a command touch as follows:

touch -a -t [time] [filename]

where the [time] is the value to be set as a WORM retention date.

According to one embodiment, a minimum WORM retention period (also referred to as a minimum WORM retention time) and a maximum WORM retention period (also referred to as a maximum WORM retention time) may be specified on a per file system or subsystem (e.g., disk/tape, volume, directory) basis. A WORM retention period of a file may be determined based on the value to be set as a WORM retention date of the file in view of the minimum WORM retention period and the maximum WORM retention period associated with the file system/subsystem in which the file is stored.

For example, according to one embodiment, if system 200 receives a request to set the "stime" to a value beyond a current time (e.g., current system time associated with the file system) plus the maximum WORM retention period, the system rejects the request and returns a permission denied error. If the system receives a request to set the "stime" to a value below the current time plus the minimum WORM retention period, the system may ignore the request.

In many operating and/or file systems, setting of the "stime" can be accomplished with the command touch set forth above. Setting of "stime" can also be accomplished programmatically through standard operating system calls, which may be mapped to standard network file interfaces (e.g. NFS, CIFS). In addition, the system may further enforce regular access controls in addition to the WORM protection. In other words, the system may allow a file to be modified only if the user attempting the modification has a permission to modify the file and the file is not a WORM file.

In one embodiment, the system may allow the permission or access control information of a WORM file to be updated. For example, the system may allow the permission or access control of a WORM file to be updated to prevent certain users from reading the file. In one embodiment, when the system receives a request to set the "stime" of a WORM file to a value larger than the current WORM retention date but less than the current time plus the maximum WORM retention period, the system extends the WORM retention date of the file to the requested value of "stime". In one embodiment, when the system receives a request to set the "stime" of a WORM file to a value smaller than the current WORM retention date, the system may reject the request with a permission denied error. This may be used to serve as a test for whether a file is a WORM file. In one embodiment, the WORM retention date of a WORM file is stored as its "stime" value and can be displayed by the command such as is −1--time=stime [filename]

Other configurations may also exist. Note that some or all of the components as shown in FIG. 2 may be implemented in software, hardware, or a combination of both.

Figure 4:
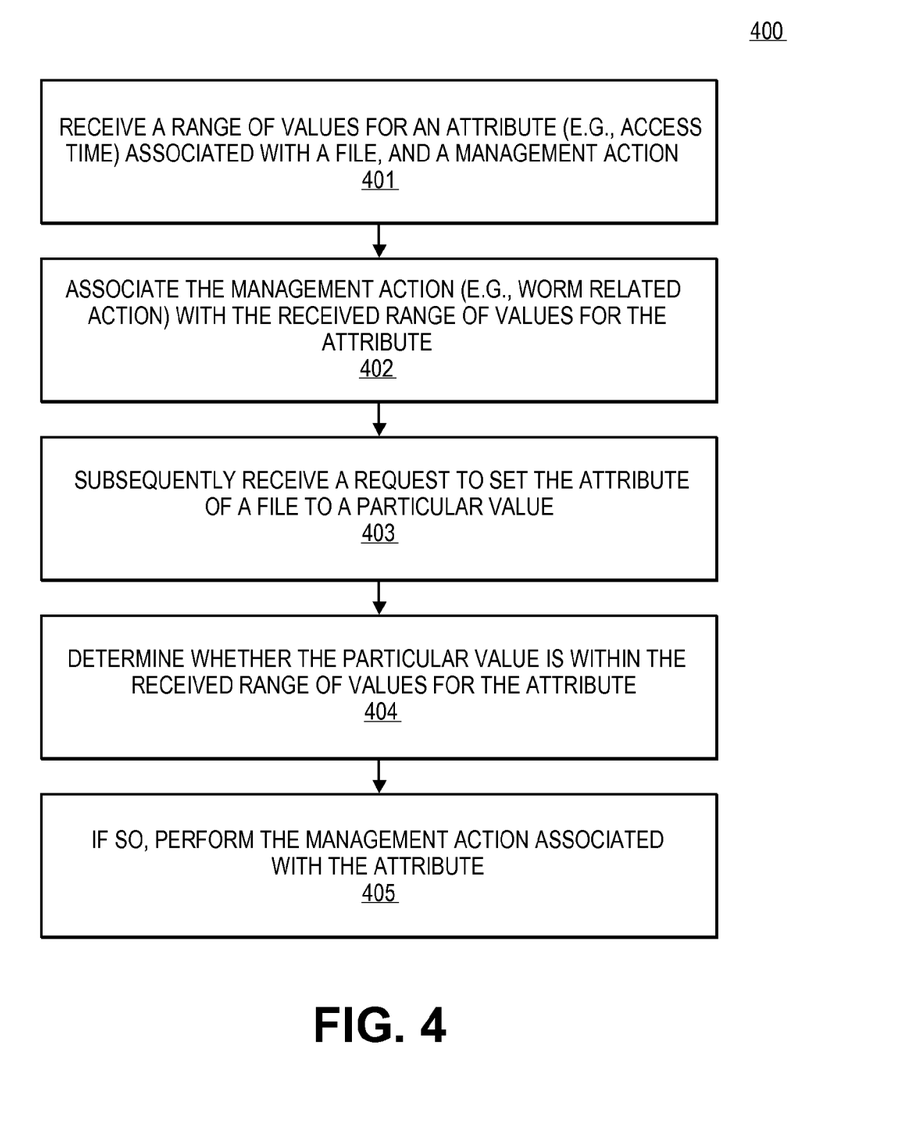
FIG. 4 is a flow diagram illustrating a process for managing files according to one embodiment of the invention.

FIG. 4 is a flow diagram illustrating a process for managing files according to one embodiment of the invention. Note that process 400 may be performed by processing logic which may include software, hardware, or a combination thereof. For example, process 400 may be performed by system 200 of FIG. 2. Referring to FIG. 4, at block 401, processing logic receives a range of values to be associated with an attribute of a file, such as, for example, atime, ctime, and/or mtime in accordance with a file system, and a management action. In one embodiment, the received range of values is outside of an ordinary range of values of the attribute (e.g., time range associated with a time attribute). In one embodiment, the management action is unrelated to an ordinary action (e.g. read/write the time attribute) associated with the attribute. At block 402, processing logic associates the management action (e.g., WORM related action) with the received range of values for the attribute.

Subsequently, at block 403, when a request is received to set the attribute of the file to a particular value, at block 404, processing logic determines whether the particular value is within the previously configured range of values (e.g., during blocks 401-402) for the attribute. If so, at block 405, processing logic performs the management action (e.g., WORM related action) associated with the attribute. In one embodiment, processing logic performs the management action associated with the attribute without performing the ordinary action (e.g., setting a time value to a time attribute) associated with the attribute. Thus, an existing attribute of a file in accordance with a file system associated with the file can be used for a management purpose other than an ordinary file system function associated with the attribute. Furthermore, a specific value may also be used to indicate a specific kind of management action to be performed.

Figure 5:
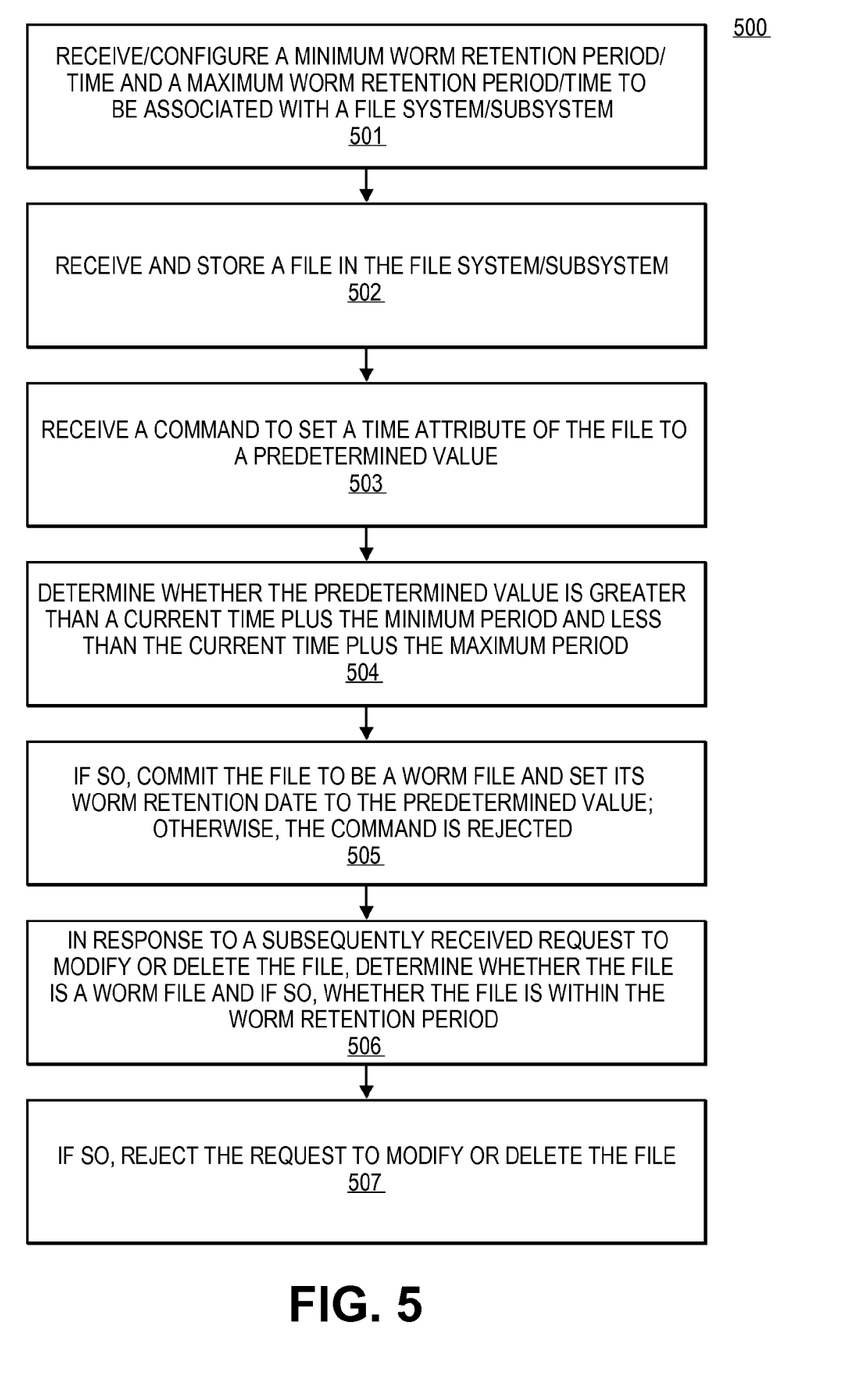
FIG. 5 is a flow diagram illustrating a process for processing WORM files according to one embodiment of the invention.

FIG. 5 is a flow diagram illustrating a process for processing WORM files according to one embodiment. Note that process 500 may be performed by processing logic which may include software, hardware, or a combination thereof. For example, process 500 may be performed by system 200 of FIG. 2. Referring to FIG. 5, at block 501, processing logic receives and configures a minimum WORM retention period/time and a maximum WORM retention period/time to be associated with a file system or a subsystem (e.g., disk/tape, volume, or directory, etc.) At block 502, processing logic receives and stores a file in the file system/subsystem. Subsequently, at block 503, processing logic receives a command to set a time attribute of the file to a predetermined value.

In response to the command, at block 504, processing logic determines whether the predetermined value is greater than a current time plus the minimum WORM retention period and less than the current time plus the maximum WORM retention period. Note that greater than and less than may include equality. Note also that the current time may be derived from a system time associated with the file system or storage system/subsystem. If so, at block 505, processing logic designates or commits the file as a WORM file and sets the WORM retention date for the file based on the predetermined value similar to one as shown in FIG. 3B; otherwise, the command is rejected. In one embodiment, if the predetermined value is less than a current time plus the minimum WORM retention period, the command is ignored. Referring to FIG. 3B, the predetermined value may be, for example, "072510", to indicate that the WORM retention date is Jul. 25, 2010 for the purposes of illustration. As can be seen, such a value, being in the future, is outside of an ordinary range of values associated with a time attribute of a file in accordance with an ordinary file system.

Thereafter, referring back to FIG. 5, in response to a request to modify or delete the file, at block 506, processing logic determines whether the file is still designated as a WORM file and if so, whether the file is still within its WORM retention period for example, by examining a current time in view of the WORM retention date associated with the file. If so, at block 507, the request is rejected. In one embodiment, after the WORM retention period expires, the file is treated as an ordinary file that can be modified or deleted. In one embodiment, after the WORM retention period expires, the file may only be deleted.

Figure 6:
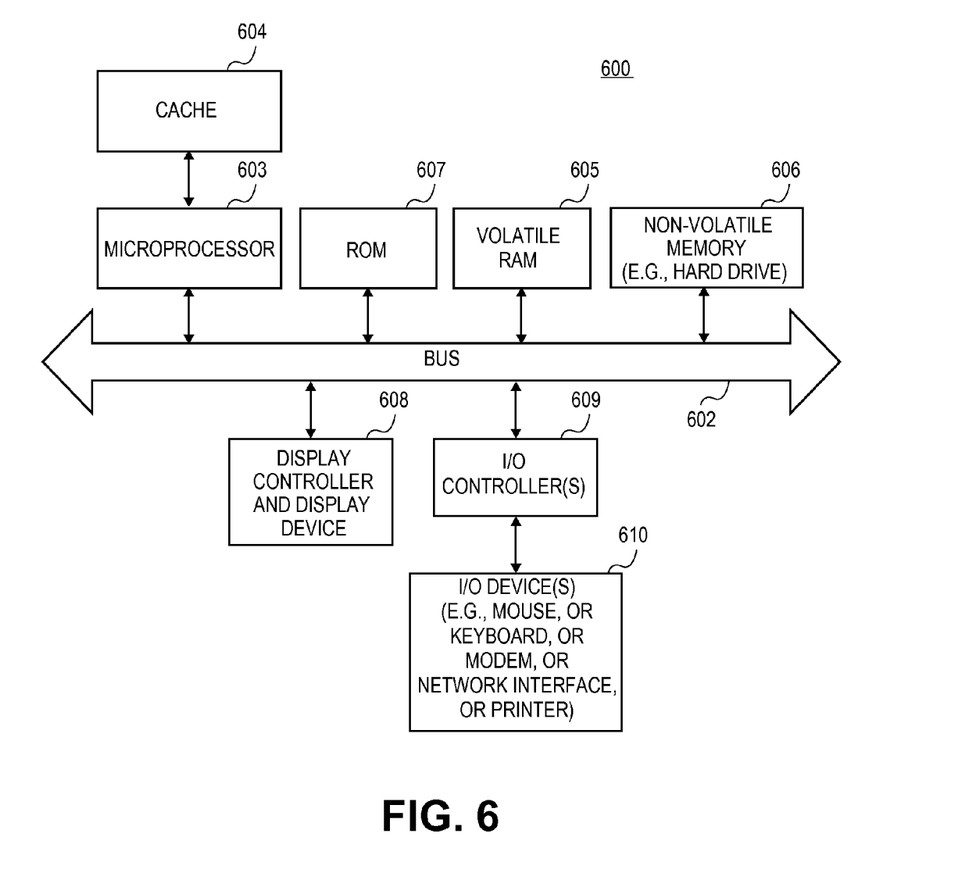
FIG. 6 is a block diagram of a data processing system which may be used with one embodiment of the invention.

FIG. 6 is a block diagram of a data processing system which may be used with one embodiment of the invention. For example, the system 600 shown in FIG. 6 may be used as a client computer system such as clients 101-102 of FIG. 1. Alternatively, the exemplary system 600 may be implemented as a server 104 of FIG. 1.

Note that while FIG. 6 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 6 may, for example, be an Apple Macintosh computer or an IBM compatible PC.

As shown in FIG. 6, the computer system 600, which is in a form of a data processing system, includes a bus or interconnect 602 coupled to a processor 603 and a ROM 607, a volatile RAM 605, and a non-volatile memory 606. Processor 603 may include multiple processors and/or core logics that constitute central processing units (CPUs) of the system and thus, control the overall operations of the system. According to certain embodiments, processor 603 accomplish this by executing software stored in any of the memories 605-607, such as, for example, applications and operating system, etc. Processor 603 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 603, which may be, for example, an Intel processor or a PowerPC processor, is coupled to cache memory 604 as shown in the example of FIG. 6. The bus 602 interconnects these various components together and also interconnects these components 603 and 605-607 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices. Other components may also be included.

Thus, techniques for providing write-once-read-many (WORM) storage have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing write-once read-many (WORM) files, comprising:
   in response to a command to set a time attribute of a file to a first predetermined value, determining whether the first predetermined value is outside of an ordinary range of values associated with the time attribute in accordance with a file system associated with the file; including determining whether the first predetermined value is greater than a current time plus a minimum WORM retention time;
   designating the file as a WORM file and setting a WORM retention period for the file based on the first predetermined value if the first predetermined value is outside of an ordinary range of values associated with the time attribute, wherein designating the file as a WORM file and setting the WORM retention period are performed in response to the command; and storing the first predetermined value as a WORM retention date in an attribute of the file if the first predetermined value is greater than the current time plus a minimum WORM retention time and less than the current time plus a maximum WORM retention time; and
   rejecting, the command if the first predetermined value is less than the current time plus the minimum WORM retention time or greater than the current time plus the maximum WORM retention time.

2. The method of claim 1, wherein the designating the file and setting the WORM retention period are performed in response to the request as a single request received from a client.

3. The method of claim 1, further comprising:
   in response to a request to set the time attribute of the file to a second predetermined value, determining a WORM retention date of the file based on the WORM retention period;
   determining whether the second predetermined value is greater than the WORM
   retention date; and
   updating the WORM retention date to the second predetermined value if the second
   predetermined value is greater than the WORM retention date.

4. The method of claim 1, wherein the time attribute of the file is defined in a standard metadata data structure associated with the file.

5. The method of claim 4, wherein the time attribute of the file is not modified if the predetermined value is within the range of values.

6. The method of claim 1, further comprising performing an ordinary action associated with the time attribute of the file if the predetermined value is within the ordinary range of the time attribute in accordance with the file system associated with the file.

7. The method of claim 1, wherein the time attribute of the file is one of an access time (atime) attribute, a status change time (ctime) attribute, and a modified time (mtime) attribute compatible with the file system associated with the file.

8. A non-transitory machine-readable storage medium having instructions stored therein, which when executed by a processor, cause the processor to perform a method for managing write-once read-many (WORM) files, the method comprising:
   in response to a command to set a time attribute of a file to a first predetermined value, determining whether the first predetermined value is outside of an ordinary range of values associated with the time attribute in accordance with a file system associated with the file; including determining whether the first predetermined value is greater than a current time plus a minimum WORM retention time;
   designating the file as a WORM file and setting a WORM retention period for the file based on the first predetermined value if the first predetermined value is outside of an ordinary range of values associated with the time attribute, wherein designating the file as a WORM file and setting the WORM retention period are performed in response to the command;

storing the first predetermined value as a WORM retention date in an attribute of the file if the first predetermined value is greater than the current time plus a minimum WORM retention time and less than the current time plus a maximum WORM retention time; and rejecting, the command if the first predetermined value is less than the current time plus the minimum WORM retention time or greater than the current time plus the maximum WORM retention time.

9. The non-transitory machine-readable storage medium of claim 8, wherein the designating the file and setting the WORM retention period are performed in response to the request as a single request received from a client.

10. The machine-readable storage medium of claim 8, wherein the method further comprises:

in response to a request to set the time attribute of the file to a second predetermined value, determining a WORM retention date of the file based on the WORM retention period;

determining whether the second predetermined value is greater than the WORM retention date; and updating the WORM retention date to the second predetermined value if the second predetermined value is greater than the WORM retention date.

11. The non-transitory machine-readable storage medium of claim 8, wherein the time attribute of the file is defined in a standard metadata data structure associated with the file.

12. The non-transitory machine-readable storage medium of claim 11, wherein the time attribute of the file is not modified if the predetermined value is within the range of values.

13. The non-transitory machine-readable storage medium of claim 8, wherein the method further comprises performing an ordinary action associated with the time attribute of the file if the predetermined value is within the ordinary range of the time attribute in accordance with the file system associated with the file.

14. The non-transitory machine-readable storage medium of claim 8, wherein the time attribute of the file is one of an access time (atime) attribute, a status change time (ctime) attribute, and a modified time (mtime) attribute compatible with the file system associated with the file.

15. A data processing system, comprising:

a processor; and a memory coupled to the processor for storing instructions, which when executed from the memory, cause the processor to in response to a command to set a time attribute of a file to a first predetermined value, determining whether the first predetermined value is outside of an ordinary range of values associated with the time attribute in accordance with a file system associated with the file; including determining whether the first predetermined value is greater than a current time plus a minimum WORM retention time;

designate the file as a WORM file and set a WORM retention period for the file based on the first predetermined value if the first predetermined value is outside of an ordinary range of values associated with the time attribute, wherein designating the file as a WORM file and setting the WORM retention period are performed in response to the command;

store the first predetermined value as a WORM retention date in an attribute of the file if the first predetermined value is greater than or equal to the current time plus a minimum WORM retention time and less than the current time plus a maximum WORM retention time;

rejecting, the command if the first predetermined value is less than the current time plus the minimum WORM retention time or greater than the current time plus the maximum WORM retention time.

16. The system of claim 15, wherein the designating the file and setting the WORM retention period are performed in response to the request as a single request received from a client.

17. The system of claim 15, wherein the processor is further to in response to a request to set the time attribute of the file to a second predetermined value, determine a WORM retention date of the file based on the WORM retention period, determine whether the second predetermined value is greater than the WORM retention date, and update the WORM retention date to the second predetermined value if the second predetermined value is greater than the WORM retention date.

18. The system of claim 15, wherein the time attribute of the file is defined in a standard metadata data structure associated with the file.

19. The system of claim 18, wherein the time attribute of the file is not modified if the predetermined value is within the range of values.

20. The system of claim 15, wherein the method further comprises performing an ordinary action associated with the time attribute of the file if the predetermined value is within the ordinary range of the time attribute in accordance with the file system associated with the file.

21. The system of claim 15, wherein the time attribute of the file is one of an access time (atime) attribute, a status change time (ctime) attribute, and a modified time (mtime) attribute compatible with the file system associated with the file.

* * * * *